(12) United States Patent
Groat et al.

(10) Patent No.: US 8,527,360 B2
(45) Date of Patent: Sep. 3, 2013

(54) METHODS AND SYSTEMS FOR CONDUCTING PAYMENT TRANSACTIONS

(75) Inventors: Michael John Groat, Fairfax Station, VA (US); Conor Robert White, Fairfax, VA (US)

(73) Assignee: Daon Holdings Limited, George Town (KY)

( * ) Notice: Subject to any disclaimer, the term of this patent is extended or adjusted under 35 U.S.C. 154(b) by 168 days.

(21) Appl. No.: 13/097,135

(22) Filed: Apr. 29, 2011

(65) Prior Publication Data

US 2012/0278193 A1 Nov. 1, 2012

(51) Int. Cl.
*G06Q 30/00* (2012.01)

(52) U.S. Cl.
USPC ............ 705/26.1; 705/26.35; 705/26.82; 705/17; 705/38; 705/39; 705/16; 705/40; 705/44; 705/67; 705/14.23

(58) Field of Classification Search
USPC ............. 705/26.1, 26.35, 26.82, 17, 38, 39, 705/40, 67, 16, 44, 14.23, 14.51, 27.1; 713/166; 726/4, 7
See application file for complete search history.

(56) References Cited

U.S. PATENT DOCUMENTS

| | | | |
|---|---|---|---|
| 7,865,436 B2 | 1/2011 | Celi, Jr. et al. | |
| 8,028,896 B2 | 10/2011 | Carter et al. | |
| 2005/0033663 A1* | 2/2005 | Narin et al. | 705/27 |
| 2005/0273442 A1* | 12/2005 | Bennett et al. | 705/67 |
| 2009/0271287 A1* | 10/2009 | Halpern | 705/26 |
| 2010/0169214 A1* | 7/2010 | Nonni et al. | 705/44 |
| 2011/0035788 A1* | 2/2011 | White et al. | 726/4 |
| 2011/0238512 A1* | 9/2011 | Doty et al. | 705/17 |
| 2011/0251892 A1* | 10/2011 | Laracey | 705/14.51 |
| 2011/0276468 A1* | 11/2011 | Lewis et al. | 705/38 |
| 2011/0282789 A1 | 11/2011 | Carroll et al. | |
| 2011/0313872 A1 | 12/2011 | Carter et al. | |
| 2011/0320289 A1* | 12/2011 | Poniatowski | 705/16 |
| 2012/0284105 A1* | 11/2012 | Li | 705/14.23 |

* cited by examiner

*Primary Examiner* — Yogesh C Garg
(74) *Attorney, Agent, or Firm* — Kevin McDermott, Esq.

(57) ABSTRACT

A method of eliminating the need to wait in line to conduct a payment transaction in a retail establishment includes initiating a network-based electronic payment transaction with a communications device in a retail establishment. A shopper initiates the network-based electronic payment transaction. Moreover, the method includes entering a machine readable code from at least one good with the communications device, determining a price of the at least one good and a total payment transaction cost, and displaying the total payment transaction cost on a screen of the communications device. Furthermore, the method includes determining whether to approve payment for the electronic payment transaction, authenticating the shopper, completing the electronic payment transaction in the retail establishment, and transmitting a transaction complete message to the communications device when the shopper is authenticated.

15 Claims, 5 Drawing Sheets

| ELECTRONIC PAYMENT TRANSACTION RISK FACTORS | | LEVEL OF RISK |
|---|---|---|
| Amount/Value | $0-100 | LOWEST |
| | $100-500 | HIGH |
| | > $500 | HIGHEST |
| Time of Day | Normal Bus. hours | LOWEST |
| | Approx. Bus. hours | HIGH |
| | Outside Bus. hours | HIGHEST |

FIG. 3

| LEVEL OF RISK | AUTHENTICATION DATA REQ. |
|---|---|
| LOWEST | NONE |
| LOW | VOICE |
| HIGH | FACE AND IRIS |
| HIGHEST | VOICE, FACE AND IRIS |

METHODS AND SYSTEMS FOR CONDUCTING PAYMENT TRANSACTIONS

BACKGROUND OF THE INVENTION

This invention relates generally to methods and systems for conducting payment transactions, and more particularly, to methods and systems for conducting network-based electronic payment transactions in a retail establishment upon authentication of a shopper conducting the electronic payment transaction.

Known methods of shopping in retail establishments typically include collecting goods for purchase and conducting a payment transaction at a point-of-sale (POS) terminal to purchase the goods. POS terminals are electronic cash registers used for conducting payment transactions and generating receipts for the transactions. Frequently, shoppers are required to spend an undesirable amount of time waiting in long lines before purchasing goods at a POS terminal. Such long lines have been known to discourage shoppers from repeatedly visiting retail establishments and to discourage new shoppers from visiting retail establishments. Thus, long waiting times have been known to negatively affect commerce at retail establishments.

Retail establishments have been known to purchase several POS terminals for conducting many simultaneous payment transactions in an effort to facilitate reducing the time spent waiting before conducting payment transactions. However, because POS terminals are known to include expensive hardware and software, and typically are operated by a sales person, retail establishments have been known to incur substantial costs in buying, maintaining, and operating such POS terminals. Some retail establishments have also been known to provide scanning devices such that while shopping, the shoppers themselves are able to scan bar codes on goods as they are collected. After collecting and scanning the goods desired for purchase, shoppers generally spend less time at a POS terminal purchasing the goods because the goods have already been scanned. However, such shoppers still must suffer the inconvenience of waiting in line before purchasing the goods in a payment transaction. Moreover, during periods of heavy shopper traffic, long lines invariably develop at POS terminals that inconvenience shoppers who are required to wait for prolonged periods of time prior to conducting a payment transaction.

BRIEF DESCRIPTION OF THE INVENTION

In one aspect, a method of eliminating the need to wait in line to conduct a payment transaction in a retail establishment includes initiating a network-based electronic payment transaction with a communications device in a retail establishment. A shopper initiates the network-based electronic payment transaction. Moreover, the method includes entering a machine readable code from at least one good with the communications device, determining a price of the at least one good and a total payment transaction cost, and displaying the total payment transaction cost on a screen of the communications device. Furthermore, the method includes determining whether to approve payment for the electronic payment transaction, authenticating the shopper, completing the electronic payment transaction in the retail establishment, and transmitting a transaction complete message to the communications device when the shopper is authenticated.

In another aspect, a system for eliminating the need to wait in line to conduct a payment transaction in a retail establishment is provided that includes a computer configured as a server. The server includes at least a database and is configured to at least store within the database a first configurable policy and to determine a resultant level of risk associated with a network-based electronic payment transaction. Moreover, the system includes a communications device associated with a shopper in the retail establishment. The communications device is configured to communicate with at least the server, to initiate the network-based electronic payment transaction in the retail establishment, to capture biometric authentication data from the shopper in the retail establishment, and to generate a receipt for each network-based electronic payment transaction. The system also includes an authentication system including an authentication system database.

The authentication system is configured to communicate with at least the server and the communications device, to store within the authentication system database biometric authentication data for each of a plurality of authorized shoppers, and to conduct a biometric authentication process while the shopper is in the retail establishment. Furthermore, the system includes a merchant system configured to communicate with at least the server, the communications device, and the authentication system. The merchant system is further configured to generate and transmit messages and to complete network-based electronic payment transactions. The communications device is further configured to communicate with the authentication system and the merchant system. After the communications device generates a receipt for the network-based electronic payment transaction, an employee of the retail establishment scans the receipt as the shopper leaves the retail establishment and permits the shopper to leave the retail establishment when the shopper has only the goods purchased.

In yet another aspect, a computer-readable recording medium on which a program is recorded is provided. The computer program causes the computer to execute at least initiating a network-based electronic payment transaction with a communications device in a retail establishment. A shopper initiates the electronic payment transaction. Moreover, the computer program causes the computer to execute determining a price of at least one good and a total payment transaction cost, displaying the total payment transaction cost on a screen of the communications device, and determining whether to approve payment for the electronic payment transaction. Furthermore, the computer program causes the computer to execute authenticating the shopper, completing the electronic payment transaction in the retail establishment, and transmitting a transaction complete message to the communications device when the shopper is authenticated.

DETAILED DESCRIPTION OF THE INVENTION

Figure 1:
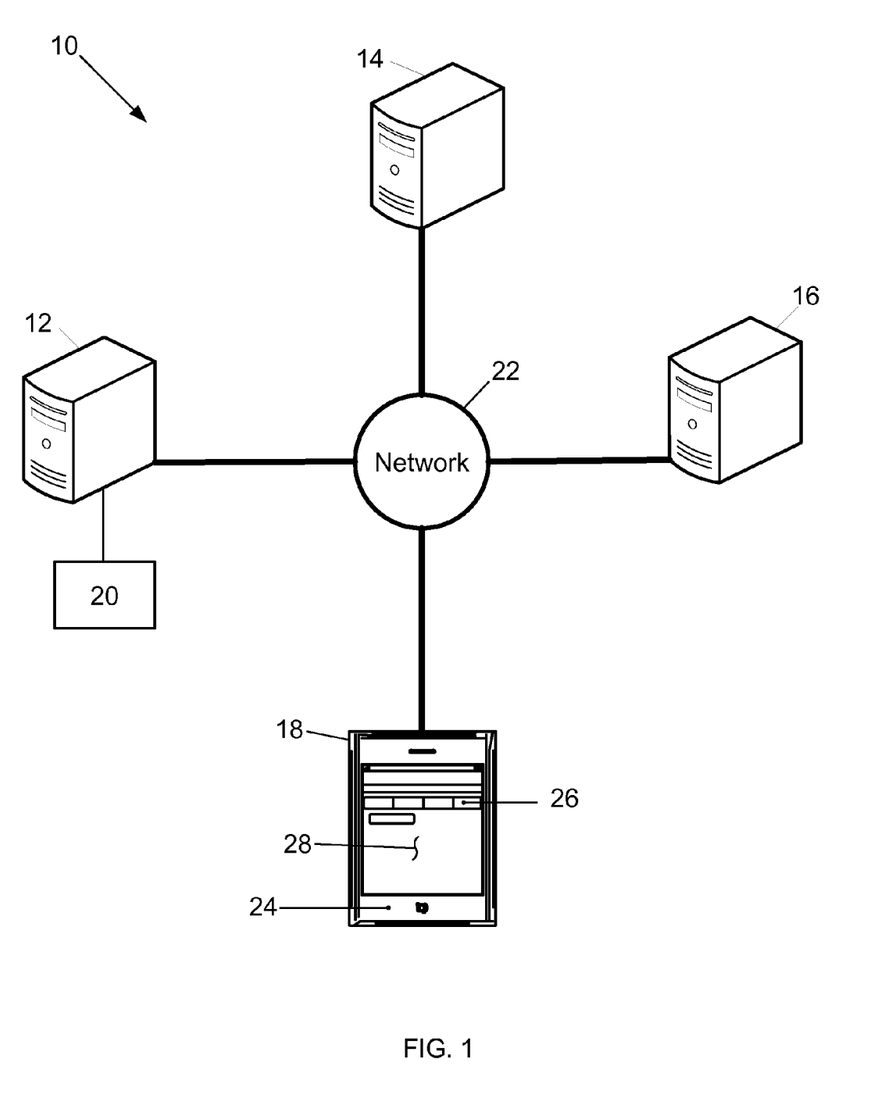
FIG. 1 is a block diagram of an exemplary embodiment of a payment transaction computer system for conducting network-based electronic transactions in a retail establishment.

FIG. 1 is an expanded block diagram of an exemplary embodiment of a system architecture of a Payment Transaction Computer (PTC) System 10 for conducting network-based electronic payment transactions in a retail establishment with a portable communications device. More specifically, the PTC system 10 includes a Merchant Server (MS) System 12, a Service Provider Computer (SPC) System 14, a Biometric Authentication Computer (BAC) System 16 and a portable communications device 18. The MS system 12, the SPC system 14, and the BAC system 16 each include components such as, but not limited to, a web server, a database server, an application server, a directory server and a disk storage unit. The disk storage unit may be used to store any kind of data. The BAC system 16 may also include a database management server and an authentication server. The database management server may be used to facilitate transferring data to and from the disk storage device. The authentication server is configured to perform matching of any feature or information associated with individuals to authenticate the identity of individuals as described herein.

The MS system 12 also includes a point-of-sales (POS) terminal 20 typically operated by a sales person. Although the exemplary embodiment includes a single POS terminal 20, in other embodiments the MS system 12 may include any number of POS terminals 20.

The MS system 12 is configured to communicate with a user of the communications device 18 over a communications network 22. In the exemplary embodiment, the communications network 22 is a 3 G communications network. However, it should be appreciated that in other embodiments the communications network 22 may be any wireless network that facilitates authentication as described herein, such as, but not limited to, WiFi, Global System for Mobile (GSM) and Enhanced Data for GSM Evolution (EDGE). Moreover, in yet other embodiments the network 22 may include any combination of such wireless networks, local area networks, wide area networks, and the Internet. The network 22 may be used by devices such as the communications device 18 to conduct long range wireless communications such as cellular telephone calls and wirelessly accessing the Internet. The MS system 12 is configured to at least generate and transmit payment transaction requests, as well as generate authentication requests and transmit the authentication requests to the BAC system 16. When the identity of the user of the communications device 18 is authenticated, the MS system 12 is configured to complete an electronic payment transaction with the communications device in a retail establishment. The MS system 12 may also be configured to store policies that determine levels of risk and policies that determine authentication data requirements for the levels of risk. Thus, the MS system 12 is a computer system of a retail establishment that requires authenticating a shopper prior to completing a network-based electronic payment transaction.

The SPC system 14 is a computer system of a financial institution service provider used to store and manage financial data for a plurality of authorized users. Although the exemplary embodiment is described as including one SPC system 14 corresponding to a financial institution service provider, it should be appreciated that in other embodiments a plurality of SPC systems 14 may be provided such that each of the plurality of SPC systems 14 is associated with a different service provider. The SPC system 14 and the MS system 12 are associated with different entities in the exemplary embodiment. However, in other embodiments the SPC system 14 and MS system 12 may be associated with the same entity.

The SPC system 14 is typically configured to communicate with the communications device 18, the MS system 12, and the BAC system 16 over the network 22. The SPC system 14 is configured to store therein a different service provider user identifier for each authorized user such that each service provider user identifier is associated with the financial data of a respective authorized user. The SPC system 14 is also configured to store therein biographic data for each authorized user such that the biographic data is associated with the service provider user identifier of a respective authorized user. Moreover, the SPC system 14 is configured to store therein a service provider identifier of the service provider operating the SPC system 14, and to generate and transmit electronic payment transaction authorizations to the MS system 12. In other embodiments, the SPC system 14 is configured to store therein at least one configurable policy for associating network-based electronic payment transaction risk factors with levels of risk.

The BAC system 16 is configured to communicate with the MS system 12, the SPC system 14, and the communications device 18 over the communications network 22. Although the BAC system 16 communicates with a single SPC system 14 in the exemplary embodiment, it should be appreciated that in other embodiments the BAC system 16 may be configured to communicate with a plurality of SPC systems 14.

The BAC system 16 is also configured to facilitate authenticating the identity of a user associated with the communications device 18 who requests conducting a network-based electronic payment transaction. Moreover, the BAC system 16 is configured to store at least authentication data in an enrollment data record for each of a plurality of authorized users. In the exemplary embodiment, the authentication data is biometric data that corresponds to any biometric type desired to be used as the basis of authenticating the identity of a user associated with the communications device 18. Such biometric types include, but are not limited to, face, fingerprint, iris, voice, vascular patterns and hand signatures. Moreover, the biometric data may take any form such as, but not limited to, images, photographs, templates and electronic data representations. The user associated with the communications device 18 in the exemplary embodiment is a shopper in a retail establishment. Thus, the BAC system 16 is configured to store biometric authentication data and is configured to use the biometric authentication data to authenticate identities of shoppers desiring to conduct network-based electronic payment transactions in retail establishments. Using biometrics as the basis for authenticating shopper identities facilitates enhancing trust in authentication results and in the integrity of network-based electronic payment transactions conducted by shoppers in retail establishments based upon such authentication results. Furthermore, the enrollment data record of each authorized user may include at least biographic data and a unique user identifier of the respective authorized user. The unique user identifier may also be stored in the SPC system 14. The service provider identifier and the unique user identifier may be alphanumeric character strings of any length.

The BAC system 16 is also configured to store at least one configurable authentication policy that indicates the authentication data required to be captured for each of a plurality of levels of risk. By indicating the authentication data requirement for each of the levels of risk, the at least one configurable authentication policy may be used to facilitate determining an authentication data requirement associated with an electronic payment transaction. Furthermore, the BAC system 16 is configured to generate and transmit authentication data capture requests to at least the communications device 18. It should be understood that an authentication data capture request includes at least an authentication data requirement, determined by the BAC system 16, that is to be captured from the shopper attempting to conduct a network-based electronic payment transaction in a retail establishment with a designated portable communications device 18.

The term "biographic data" as used herein includes any demographic information regarding a user including, but not limited to, the user's name, age, date of birth, address, citizenship and marital status. Contact information including devices associated with authorized users and methods for contacting the authorized user may also be collected from the user. In the exemplary embodiment, users designate a particular communications device and provide information regarding the designated communications device that facilitates validating the designated communications device as known, facilitates communicating with the authorized user, and facilitates authenticating the identity of the authorized user. Such information includes, but is not limited to, a communications device identifier of the designated communications device, a telephone number associated with the designated communications device, an e-mail address that can be accessed using the designated communications device, an instant messaging user identifier that can be accessed, and an identifier that facilitates sending short message service (SMS) messages to the designated communications device.

The information regarding the designated communications device is included in the enrollment data record of the authorized user of the designated communications device 18. By virtue of including the communications device identifier in the enrollment data record, the communications device identifier is associated with the unique user identifier of the authorized user. In the exemplary embodiment the portable communications device 18 is the designated communications device. Additionally, a state of the communications device 18 may be included in the enrollment data record of the user and thus associate the state of the device 18 with the designated communications device information. It should be appreciated that the SPC system 14 may also store therein the communications device identifier such that the communications device identifier is associated with the service provider user identifier of the authorized user in the SPC system 14.

Although the authentication data is described as biometric data in the exemplary embodiment, it should be appreciated that in other embodiments any other type of authentication data, or combinations of different types of authentication data, may be used that facilitates authenticating the identity of a user. Such other types of authentication data include, but are not limited to, Global Positioning System (GPS) coordinates, unique pass-phrases, a combination of biometric data with GPS coordinates, a combination of biometric data with a unique pass-phrase, a combination of GPS coordinates with a unique pass-phrase, and a combination of biometric data with GPS coordinates and a unique pass-phrase.

GPS coordinates may be determined for any GPS enabled device used by an authorized user to communicate with the BAC system 16. For example, GPS coordinate data may be determined for a retail establishment such that an area of the retail establishment computed from the GPS coordinate data is stored in the BAC system 16. When GPS coordinates of the designated communications device 18 are determined to be located within the retail establishment area, the user may conduct an electronic payment transaction with the retail establishment as long as the user is authenticated and the transaction is authorized. Otherwise, when the designated communications device 18 is determined to be outside of the retail establishment area, the user is not permitted to conduct an electronic payment transaction with the retail establishment.

Unique pass-phrases may also be established for each authorized user and stored in the BAC system 16 such that a user desiring to conduct a network-based electronic payment transaction in a retail establishment with the designated communications device 18, provides the unique pass-phrase for authentication. Unique pass-phrases are alphanumeric character strings that may be manually input or spoken into the communications device 18.

The communications device 18 is configured to conduct long range wireless communications including, but not limited to, cellular telephone calls and wirelessly accessing the Internet over the network 22. Moreover, the communications device 18 is configured to communicate with at least the MS system 12, the SPC system 14, and the BAC system 16 over the network 22. Additionally, in the exemplary embodiment, the communications device 18 is configured to capture authentication data from users desiring to conduct a network-based electronic payment transaction while in a retail establishment. The communications device 18 includes a front face 24 and a back face (not shown). The front face 24 includes at least one of buttons and icons 26 configured to at least enter commands, enter data such as unique pass-phrases, and invoke applications stored in the device 18. Applications stored in the communications device 18 include at least a security application and a retail purchasing application. Furthermore, the front face 24 includes a display screen 28 such as, but not limited to, a Liquid Crystal Display (LCD). The communications device 18 is configured to at least display at least one of text and images on the display screen 28. In the exemplary embodiment, the communications device 18 is a portable cellular phone configured to at least display at least one of text and images, capture authentication data from a user, and transmit the captured authentication data to the BAC system 16.

Additionally, the communications device 18 is configured to store a plurality of service provider user identifiers and corresponding service provider identifiers for use in electronic payment transactions conducted in a retail establishment. In the exemplary embodiment, the service provider user identifier is a credit card number of a credit card a shopper desires to use for purchasing goods. In other embodiments, the service provider user identifier may be any alphanumeric character string such as, but not limited to, a debit card number or an e-mail address associated with the shopper that is capable of facilitating completing the electronic payment transaction. Thus, for example, the communications device 18 may store a credit card number issued by a first bank with the corresponding service provider identifier of the first bank, and a debit card number issued by a second bank with the corresponding service provider identifier of the second bank.

The user may designate a service provider user identifier as a default service provider user identifier for each service provider. Alternatively, the communications device 18 may display a list of service provider user identifiers on the screen 28 that a user may select from for conducting a network-based electronic payment transaction.

Although the communications device 18 is a portable cellular phone in the exemplary embodiment, it should be appreciated that in other embodiments the communications device 18 may be any portable communications device capable of at least displaying at least one of text and images, and capturing and transmitting data. Such other communications devices 18 include, but are not limited to, a smart phone, a tablet computer, a laptop computer, and any type of portable communications device having wireless capabilities such as a personal digital assistant (PDA). Authentication data captured during authentication of a user is captured from the user with the designated communications device 18. However, in the exemplary embodiment the captured biometric data is not stored in the communications device 18 due to security concerns that the biometric data may be discovered should the device 18 be lost or stolen. Instead, the communications device 18 transmits the captured biometric data to the BAC system 16 for storage therein. However, in other embodiments with lesser security concerns, the captured biometric data may be stored in the device 18.

The MS system 12, the SPC system 14, the BAC system 16, and the communications device 18, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the MS system 12, the SPC system 14, the BAC system 16 and the communications device 18. The above examples are exemplary only, and are thus not intended to limit in any way the definition and/or meaning of the term "processor."

The respective memories (not shown) in the MS system 12, the SPC system 14, the BAC system 16, and the communications device 18, can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the MS system 12, the SPC system 14, the BAC system 16, and the communications device 18. Moreover, each of the respective memories (not shown) can be a computer-readable recording medium used to store computer programs or executable instructions that are executed, respectively, by the merchant server system 12, the SPC system 14, the BAC system 16, and the communications device 18. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program. It should be understood that as described herein, applications are computer programs. Thus, the security and the retail purchasing applications described herein are computer programs.

It should be appreciated that the MS system 12, the network 22, the SPC system 14, and the BAC system 16, together constitute a first communications channel. Moreover, it should be appreciated that the communications device 18 and a part of the network 22 between the communications device 18 and the BAC system 16, together constitute a second communications channel separate and distinct from the first communications channel. Attackers that are able to monitor communications and phish for user names and passwords over the first communications channel are typically not aware of the second communications channel, and thus are not motivated to monitor communications and phish over the second channel. As a result, security of network-based electronic payment transactions conducted by shoppers in a retail establishment with the designated communications device 18 is facilitated to be increased and ease of integration with existing legacy systems is facilitated to be enhanced.

Users are required to enroll in the SPC system 14 prior to using the designated communications device 18 for conducting network-based electronic payment transactions. During enrollment in the SPC system 14, a service provider user identifier and biographic data of the user are obtained and stored in the SPC system 14 such that the biographic data is associated with a corresponding service provider user identifier. The communications device 18 is also required to be enrolled in the BAC system 16 prior to conducting a network-based electronic payment transaction. Specifically, a communications device identifier obtained from the communications device 18 is included in the enrollment data record of the user of the designated communications device 18. The service provider user identifier and a service provider identifier that identifies the financial institution service provider are included in the enrollment data record of the user such that the service provider user identifier and the service provider identifier are associated with the communications device identifier and the unique user identifier. By thus associating the service provider user identifier with the communications device identifier, the designated communications device 18 is enrolled in the BAC system 16.

Although the service provider identifier is obtained from the user during enrollment in the BAC system 16 in the exemplary embodiment, it should be appreciated that in other embodiments the identities of a plurality of different service providers may be obtained and associated with the unique user identifier in the BAC system 16. That is, the user may provide the service provider identifiers of a plurality of different service providers and associated service provider user identifiers that are to be stored in the BAC system 16 and associated with the unique user identifier in the BAC system 16. It should be appreciated that each different service provider has a corresponding SPC system 14 that stores therein at least service provider user identifiers that uniquely identify the user to the corresponding SPC system 14. Thus, it should be understood that in other embodiments by virtue of the service provider user identifier being associated with each of the different service provider identities, the BAC system 16 may be associated with each of the corresponding SPC systems 14 such that the BAC system 16 is able to determine the SPC systems 14 to communicate with for each user.

In the exemplary embodiment, the communications device identifier and the service provider user identifier of each authorized user are stored in the enrollment data record of the authorized user. Thus, the service provider identifier is associated with all other data included in the enrollment data record. It should be understood that by virtue of associating the service provider user identifier with the financial data of a respective authorized user in the SPC system 14, and including the service provider user identifier in the enrollment data record of the authorized user, the service provider user identifier functions to map data stored in the SPC system 14 associated therewith to data stored in the BAC system 16 associated with the same service provider user identifier. Thus, it should be appreciated that in the exemplary embodiment information stored in the SPC system 14 facilitates mapping between data stored in the SPC system 14 and data stored in the BAC system 16.

Figure 2:
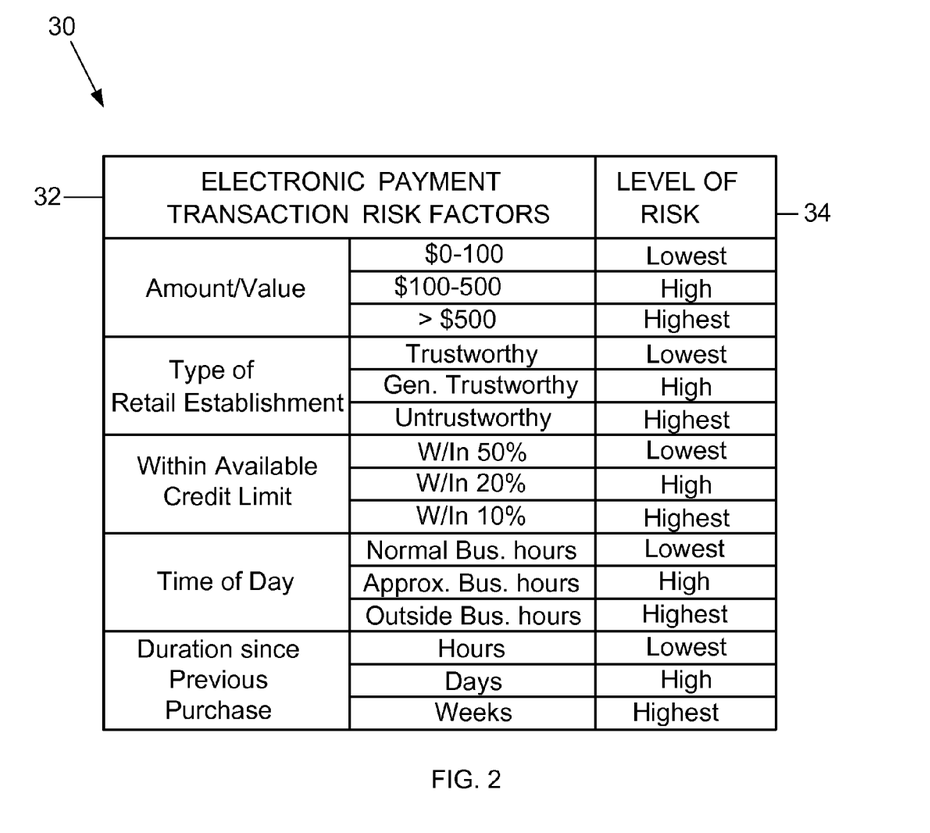
FIG. 2 is a diagram illustrating a first exemplary configurable policy for associating network-based electronic payment transaction risk factors with corresponding levels of risk.

FIG. 2 is a diagram illustrating a first exemplary configurable policy 30 that is stored in the SPC system 14 and is for associating each of a plurality of network-based electronic payment transaction risk factors 32 with a corresponding level of risk 34. The levels of risk 34 define categories of risk associated with network-based electronic payment transactions that vary from a highest to a lowest level of risk. Specifically, the policy 30 includes a plurality of electronic payment transaction risk factors 32 and associates each risk factor 32 with a corresponding level of risk 34. Such risk factors 32 may include, but are not limited to, the amount or value of the payment transaction, the type of retail establishment, the amount of credit available to a shopper, the time of day the payment transaction is made, and the duration since a previous payment transaction. Moreover, each of the electronic payment transaction risk factors 32 is divided into subcategories such that each subcategory is associated with a corresponding level of risk 34. For example, the value of a purchase may be divided into subcategories according to value, such as $0-100, $100-500, and greater than $500. Each subcategory is assigned a corresponding level of risk 34. Consequently, an electronic payment transaction worth less than $100 may be associated with a lowest level of risk 34, an electronic payment transaction worth between $100 and $500 may be associated with a high level of risk 34, and an electronic payment transaction worth greater than $500 may be associated with a highest level of risk 34.

Similarly, the type of retail establishment risk factor 32 may be divided into subcategories according to a level of trust associated with each retail establishment such as trustworthy, generally trustworthy, and untrustworthy. A retail establishment may be considered trustworthy because electronic payment transaction problems have not been encountered with the retail establishment. A retail establishment may be considered generally trustworthy because at least some electronic payment transaction problems have been encountered with the retail establishment. A retail establishment may be considered untrustworthy because significant electronic payment transaction problems have been encountered with the retail establishment. Consequently, a trustworthy retail establishment may be associated with a low level of risk 34, a generally trustworthy retail establishment may be associated with a high level of risk 34, and an untrustworthy retail establishment may be associated with the highest level of risk 34.

It should be understood that the electronic payment transaction risk factors 32 and the associated levels of risk 34 may be defined in any desirable manner that facilitates authenticating the identity of a user as an authorized user of a designated communications device 18. Moreover, the definitions of the transaction risk factors 32 and the levels of risk 34 may be changed.

It should be appreciated that any network-based electronic payment transaction may involve a plurality of the electronic payment transaction risk factors 32, and that a resultant level of risk may be determined using the levels of risk 34 associated with each of the involved electronic payment transaction risk factors 32. The SPC system 14 compares the levels of risk 34 associated with each of the involved electronic payment transaction risk factors 32 and determines which risk factor 32 has the greatest level of risk 34. The greatest level of risk 34 is determined to be the resultant level of risk and is used as the basis for authenticating the user. For example, when an electronic payment transaction for less than $100 is conducted with an untrustworthy retail establishment, the level of risk associated with each of the involved electronic payment transaction risks 32 is determined as lowest and highest, respectively, by the SPC system 14. Because the level of risk 34 associated with an untrustworthy retail establishment is greater than the level of risk 34 associated with an electronic payment transaction worth less than $100, the resultant level of risk is the level of risk 34 associated with the untrustworthy retail establishment. Although the greatest level of risk 34 associated with the payment transaction risk factors is determined to be the resultant level of risk in the exemplary embodiment, it should be appreciated that in other embodiments any other known technique may be used to combine a plurality of the risk factors 32 to obtain an optimal overall risk rating, or optimal resultant level of risk.

Figure 3:
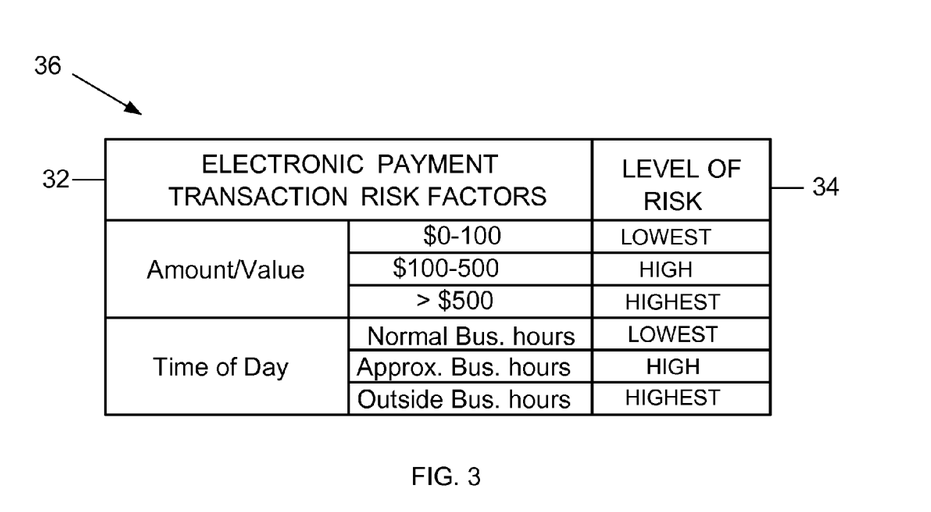
FIG. 3 is a diagram illustrating a second exemplary configurable policy for associating network-based electronic payment transaction risk factors with corresponding levels of risk.

The information shown in FIG. 3 is the same information shown in FIG. 2 as described in more detail below. As such, information included in FIG. 3 that is identical to information included in FIG. 2, is identified using the same reference numerals used in FIG. 2.

FIG. 3 is a diagram illustrating a second exemplary configurable policy 36 that is stored in the MS system 12 and is for associating each of a plurality of network-based electronic payment transaction risk factors 32 with a corresponding level of risk 34. This embodiment is similar to that shown in FIG. 2. However, the second configurable policy 36 does not include the transaction risk factors 32 relating to the type of retail establishment, the credit limit, and the duration since a previous transaction. Although in this embodiment the second configurable policy 36 includes the transaction risk factors 32 relating amount/value of the payment transaction and the time of day, it should be appreciated that in other embodiments any type of electronic payment transaction risk factor 32 may be included that facilitates conducting the electronic payment transaction as described herein.

The electronic payment transaction risk factors 32 and the associated levels of risk 34 may be defined in any desirable manner that facilitates authenticating the identity of a user as an authorized user of a designated communications device 18. Moreover, the definitions of the transaction risk factors 32 and the levels of risk 34 may be changed.

Although policies 30, 36 for determining the levels of risk 34 are used to determine the resultant level of risk in the exemplary embodiment, it should be understood that other embodiments may not include such policies. In such other embodiments a default level of risk may be established for all network-based electronic payment transactions. The default level of risk may require using a personal identification number (PIN) to authenticate the shopper.

Figure 4:
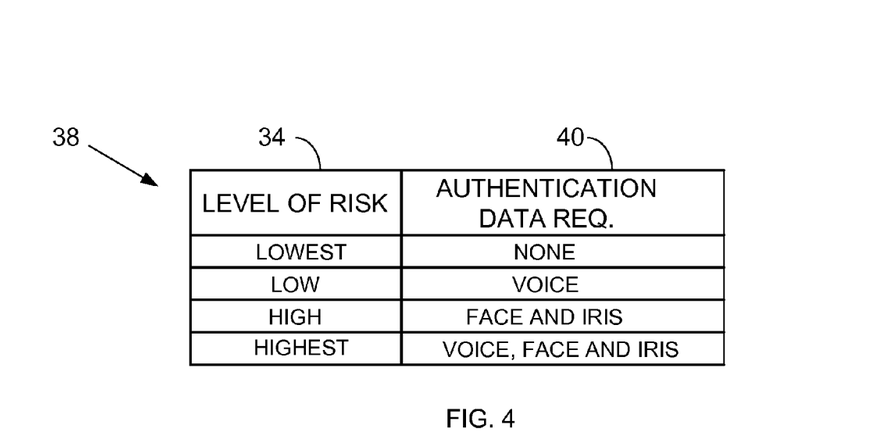
FIG. 4 is a diagram illustrating an exemplary authentication policy associating each of the levels of risk illustrated in FIGS. 2 and 3 with a corresponding authentication data requirement.

FIG. 4 is a diagram illustrating an exemplary configurable authentication policy 38 that is stored in the BAC system 16, and is for associating each of the levels of risk 34 with a corresponding authentication data requirement 40. Specifically, the authentication policy 38 includes the same level of risk 34 categories established in the first configurable policy 30, and further includes a level of risk 34 designated as low. Moreover, the authentication policy 38 includes an authentication data requirement 40 for use in authenticating a user of a designated communications device 18 while conducting an electronic payment transaction with the designated communications device 18. In the exemplary embodiment the authentication data requirement 40 is the authentication data required to be captured and used for authentication of the user. It should be appreciated that in other embodiments the authentication data requirement 40 may be a requirement for any other type of authentication data including, but not limited to, Global Positioning System (GPS) coordinates, unique pass-phrases, a combination of biometric data with GPS coordinates, a combination of biometric data with a unique pass-phrase, a combination of GPS coordinates with a unique pass-phrase, and a combination of biometric data with GPS coordinates and a unique pass-phrase.

The authentication policy 38 is generated by associating an authentication data requirement 40 with each level of risk 34. It should be appreciated that the authentication data requirements 40 indicate at least one biometric type that is to be captured from a user while authenticating the identity of the user as an authorized user of the designated communications device 18. The biometric types that are to be captured and used for authentication are determined by the level of risk 34. It should be appreciated that the higher the level of risk 34 the more demanding the authentication data requirement 40.

In order to facilitate enhancing increased trust in the authentication results, as the level of risk 34 associated with the electronic payment transaction increases the number of different biometric types required for authentication also increases. For example, an electronic payment transaction having a low level of risk 34 requires biometric data of a single biometric type such as voice biometric data. An electronic payment transaction having a high level of risk 34 requires biometric data of a plurality of different biometric types such as face and iris biometric data. It should be appreciated that the authentication data requirement 40 for a level of risk 34 may be a combination of the authentication data requirements 40 appropriate for lesser levels of risk 34. For example, the authentication data requirement 40 for the highest level of risk 34 may be a combination of the authentication data requirements 40 of the high and low levels of risk 34.

It should be understood that the authentication policy 38 may be reconfigured by defining the authentication data requirements 40 and the levels of risk 34 in any desirable manner that facilitates authenticating the identity of a user as an authorized user of the designated communications device 18. Moreover, the policy 38 may be reconfigured by changing the definitions of the authentication data requirements 40 and the levels of risk 34. For example, the authentication data requirement 40 for a high level risk 34 may be reconfigured such that the appropriate authentication data requirement 40 stipulates authenticating the user with face, iris and fingerprint biometric data, instead of face and iris biometric data. Although the exemplary embodiment includes one authentication policy 38 stored in the BAC system 16, it should be appreciated that in other embodiments any number of authentication policies 38 may be generated and stored in the BAC system 16. It should be understood that changes in levels of risk 34 are to be coordinated between the first policy 30, the second policy 36, and the authentication policy 38.

Figure 5:
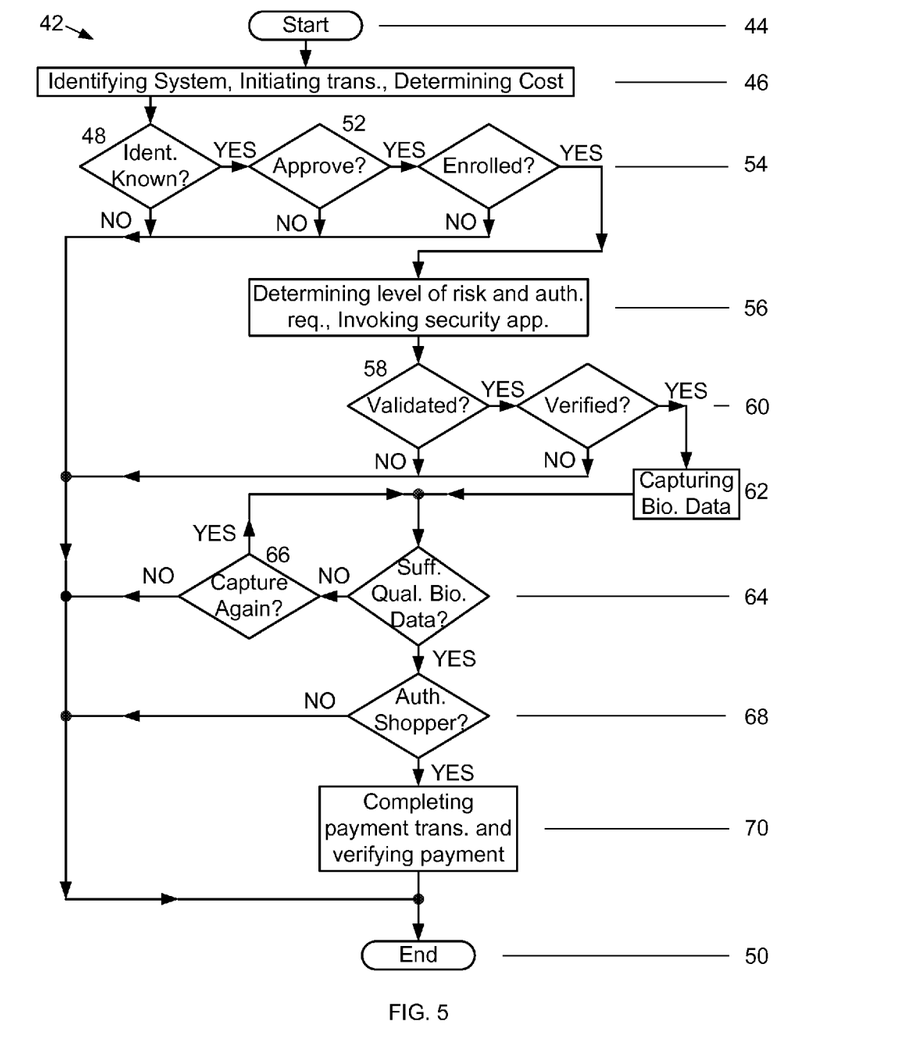
FIG. 5 is a flowchart illustrating an exemplary network-based electronic payment transaction process for eliminating the need to wait in line before conducting payment transactions.

FIG. 5 is a flowchart 42 illustrating an exemplary network-based electronic payment transaction process used by the PTC system 10 for eliminating the need to wait in line to conduct payment transactions at a point-of-sale (POS) terminal in a retail establishment. For PTC system 10 the process starts 44 when a shopper in a retail establishment decides to purchase the goods without going through the POS terminal. The shopper continues by identifying 46 the MS system 12 that is to be used for conducting a network-based electronic payment transaction to purchase the goods. More specifically, the shopper continues by obtaining 46 the communications device 18 and invoking a retail purchasing application stored therein by activating one of the buttons or icons 26. The purchasing application causes the communications device 18 to display a list of retail establishments on the screen 28. The shopper identifies the MS system 12 to be used for the transaction by selecting the retail establishment from which he would like to purchase the goods.

Next, the communications device 18 continues processing by initiating 46 the electronic payment transaction by transmitting an initiation message to the MS system 12 of the selected retail establishment. In response, the MS system 12 transmits a message to the communications device 18 requesting the shopper to conduct the electronic payment transaction. After receiving the response from the MS system 12, the communications device 18 continues processing by automatically selecting the service provider user identifier associated with the selected retail establishment as the service provider user identifier to be used for conducting the electronic payment transaction. Next, the shopper continues by entering a machine readable code from each good with the communications device 18. Specifically, the shopper continues by photographing the machine readable code of each good with the communications device 18. The machine readable code includes, but is not limited to, a bar code, a Quality Response (RS) code, and a Data Matrix code.

After photographing the machine readable code of a good, the communications device 18 continues by processing the photograph to determine the Universal Product Code (UPC) of the good and transmitting the UPC to the MS system 12. In response, the MS system 12 continues by transmitting the price of the good to the communications device 18. The communications device 18 displays the price of the good on the screen 28 for the shopper to see and stores the price therein. After determining the price of all the goods, processing continues by determining the total payment transaction cost 46 and displaying the total payment transaction cost on the screen 28 for the shopper to see. Although a photograph of each bar code is taken to determine the UPC and price of each good in the exemplary embodiment, in other embodiments the price of each good may be determined in any manner using the communications device 18.

After reading the total payment transaction cost from the screen 28, the shopper continues by activating one of the buttons or icons 26 to purchase the goods. Next, processing continues by generating a payment transaction request at the communications device 18 and transmitting the payment transaction request from the device 18 to the MS system 12. The payment transaction request includes at least the UPC of each good to be purchased and the service provider user identifier to be used for conducting the transaction. After receiving the payment transaction request, the MS system 12 continues by generating a merchant payment transaction request and transmitting the merchant payment transaction request to the SPC system 14. The merchant payment transaction request includes at least the UPC of each good to be purchased and the service provider user identifier.

After receiving the merchant payment transaction request, the SPC system 14 continues by determining whether or not the service provider user identifier received in the merchant payment transaction request is known 48 by comparing the received service provider user identifier against the service provider user identifiers stored therein. When the received service provider user identifier does not match a service provider user identifier stored therein, the received service provider user identifier is not known. The SPC system 14 generates a notification message indicating that the received service provider user identifier is not known and transmits the notification to the MS system 12. Next, processing ends 50. However, when the received service provider user identifier matches a service provider user identifier stored therein, the received service provider user identifier is determined to be known 48.

After determining that the received service provider user identifier is known 48, the SPC system 14 continues processing by determining whether to approve 52 payment for the electronic payment transaction based on standard credit card practices. When the electronic payment transaction is not approved 52, processing ends 50. However, when payment for the electronic payment transaction is approved 52, the SPC system 14 continues processing by generating a payment transaction authorization message and transmitting the payment transaction authorization message to the MS system 12.

Next, processing continues by determining whether the communications device 18 is enrolled 54 in the BAC system 16. After receiving the payment transaction authorization message, the MS system 12 continues processing by transmitting the service provider user identifier to the BAC system 16. After receiving the service provider user identifier, the BAC system 16 continues by comparing the received service provider user identifier against service provider user identifiers stored therein. Upon determining a match between the received service provider user identifier and one of the service provider user identifiers stored therein, the BAC system 16 continues processing by determining the communications device identifier associated with the one matching service provider user identifier and determining a state of the associated communications device identifier. When the state of the associated communications device identifier is enrolled, the communications device 18 is considered to be enrolled in the BAC system 16. When the state of the associated communications device identifier is not enrolled 54, processing ends 50.

After determining that the communications device 18 is enrolled 54, the BAC system 16 continues by notifying the MS system 12 that the communications device 18 associated with the service provider user identifier is enrolled therein. In response, the MS system 12 continues processing by determining 56 the risk factors 32 associated with the electronic payment transaction and determining 56 the resultant level of risk for the electronic payment transaction.

After determining 56 the resultant level of risk, processing continues by determining 56 the authentication data requirement for the electronic payment transaction. Specifically, processing continues by generating an authentication request at the MS system 12 and transmitting the authentication request to the BAC system 16 over the first communications channel. The authentication request contains at least the resultant level of risk.

After receiving the authentication request, the BAC system 16 continues processing by extracting the resultant level of risk from the authentication request and consulting the authentication policy 38 to determine the authentication data requirement 40 that corresponds to the resultant level of risk. Specifically, the BAC system 16 continues by comparing the resultant level of risk against the levels of risk 34 to determine the corresponding authentication data requirement 40. The authentication data requirement 40 is determined to be the authentication data requirement 40 that corresponds to the level of risk 34 that matches the resultant level of risk.

Although the exemplary embodiment uses the authentication policy 38 to determine the authentication data requirement 40, it should be appreciated that in other embodiments an authentication policy may not be available. In such other embodiments, all available data may be collected from the shopper regardless of the risk factors 32, the data collected may be determined by the shopper, the shopper may be repeatedly prompted for authentication data until sufficient authentication data is obtained, or the BAC system 16 may determine to end processing 50. Moreover, it should be appreciated that in other embodiments the BAC system 16 may determine the resultant level of risk associated with the electronic payment transaction.

After determining 56 the authentication data requirement, the BAC system 16 continues by transmitting a message to the communications device 18 to invoke the security application stored therein. After transmitting the message, the BAC system 16 continues processing by generating and transmitting an authentication data capture request to the communications device 18 over the second communications channel. In the exemplary embodiment, the authentication data capture request includes at least the authentication data requirement 40.

After invoking 56 the security application, the security application causes the communications device 18 to continue processing by obtaining the communications device identifier of the communications device 18, and by initiating communications with the BAC system 16 by transmitting the communications device identifier to the BAC system 16 over the second communications channel. After receiving the communications device identifier, the BAC system 16 validates 58 the communications device 18 by determining whether the communications device 18 is known. Specifically, the BAC system 18 continues by comparing the received communications device identifier against the communications device identifiers stored therein, and determining that the communications device 18 is known, and thus validated, when the received communications device identifier matches one of the communications device identifiers stored therein. Otherwise, when the received communication device identifier does not match one of the communications device identifiers stored in the BAC system 16, the communications device 18 is not validated 58 and processing ends 50.

Upon receiving the authentication data capture request transmission, the communications device 18 continues by verifying 60 that the authentication data capture request was transmitted from the BAC system 16. After verifying that the authentication data capture request was transmitted from the BAC system 16, the security application causes the communications device 18 to display the authentication data capture request on the screen 28. Next, the shopper continues processing by reading the authentication data capture request from the screen 28 and capturing biometric authentication data 62 in accordance with the authentication data requirement included in the authentication data capture request. When the authentication data capture request cannot be verified as being transmitted from the BAC system 16, processing ends 50.

It is assumed that the authorized shopper associated with the inputted service provider user identifier is in possession of the communications device 18 in the exemplary embodiment, and can be contacted using the communications device 18. Thus, by virtue of validating the communications device 18 and transmitting the authentication data capture request to the communications device 18, the authentication data capture request is considered to be transmitted to the authorized shopper associated with the inputted service provider user identifier. After reading the authentication data capture request transmission from the screen 28, the shopper continues processing by capturing biometric authentication data 62 in accordance with the authentication data capture request with the communications device 18. Next, processing continues by transmitting the captured biometric data from the communications device 18 to the BAC system 16 over the second communications channel, and evaluating the captured biometric data at the BAC system 16 to verify that the captured biometric data is of sufficient quality 64. When the captured biometric data is of sufficient quality 64, processing continues by authenticating the identity of the shopper. However, when the quality of the captured biometric data is insufficient 64, processing continues by again capturing the requested biometric authentication data 66.

In the exemplary embodiment, biometric authentication data corresponding to the requested biometric authentication data may be captured six times. When acceptable biometric authentication data is not obtained after six attempts, processing ends 50. However, it should be appreciated that in other embodiments biometric data may be obtained any number of times.

After capturing biometric data of sufficient quality 64, processing continues by authenticating the identity of the shopper 68 by comparing the captured biometric data against the authentication data included in the enrollment data record of the authorized shopper associated with the one matching communications device identifier in the BAC system 16. When the identity of the shopper is not authenticated, processing ends 50. However, when the captured biometric data matches the authentication data included in the enrollment data record, the identity of the shopper is considered to be authenticated 68.

After authenticating the identity of the shopper 68, the BAC system 16 continues by generating and transmitting an authentication result message to the MS system 12. Next, the MS system 12 continues processing by completing the desired electronic payment transaction 70 with the service provider user identifier and transmitting a transaction complete message to the communications device 18 notifying the shopper that the transaction was completed. The communications device 18 continues by displaying the transaction complete message on the screen 28 for the shopper to see.

After receiving the transaction complete message, the communications device 18 continues processing by generating an electronic receipt for the electronic payment transaction. The electronic receipt includes at least a machine readable code that indicates the details of the completed electronic payment transaction including, but not limited to, the goods purchased. The machine readable code includes, but is not limited to, a two-dimensional code. Moreover, the electronic receipt is displayed on the screen 28 upon generation. After displaying the electronic receipt on the screen 28, an employee of the retail establishment continues by scanning the machine readable code from the electronic receipt as the shopper leaves the retail establishment to determine the goods purchased and verify that the shopper is leaving with only the goods purchased. In other embodiments after scanning the machine readable code, a photograph of the shopper may be presented to the employee on a display to facilitate verifying that an imposter did not purchase the goods. The employee continues by permitting the shopper to leave the retail establishment when the shopper is leaving with only the goods purchased. Next, processing ends 50.

It should be understood that in other embodiments after invoking the retail purchasing application 46 and prior to entering the machine readable codes on the goods, processing continues by calculating the GPS coordinates of the communications device 18 and comparing the GPS coordinates of the communications device 18 against an area of the retail establishment determined from GPS coordinate data. When the GPS coordinates of the communications device 18 are located within the area of the retail establishment, processing continues by entering the machine readable codes of the goods. Otherwise, when the GPS coordinates of the communications device 18 are not located within the retail establishment, processing continues by deactivating the retail purchasing application such that processing ends 50.

Although the MS system 12 that is to be used for conducting the electronic transaction is identified and selected by the shopper from a list displayed on the screen 28, in other embodiments any other method may be used to identify the MS system 12 that is to be used for conducting the electronic payment transaction. In such other embodiments the shopper may photograph a machine readable code posted in the retail establishment with the device 18. The machine readable code includes, but is not limited to, a Quick Response (QR) code and a Data Matrix code. The machine readable code indicates at least the MS system 12 of the retail establishment to be used for conducting the transaction. Upon processing the machine readable code, the communications device 18 identifies the MS system 12 to communicate with for conducting the transaction.

Moreover, in such other embodiments the communications device 18 may automatically receive a radio frequency (RF) signal broadcast by the retail establishment upon entering the retail establishment that identifies the MS system 12 to be used for conducting the transaction. Furthermore, in such other embodiments the GPS coordinates of the communications device 18 may be compared against the GPS coordinates of a retail establishment. When the communications device 18 is located within the retail establishment the communications device 18 is configured to communicate with the MS system 12 of the retail establishment. Additionally, in such other embodiments the shopper may enter the name of the retail establishment into the communications device 18.

Figure 6:
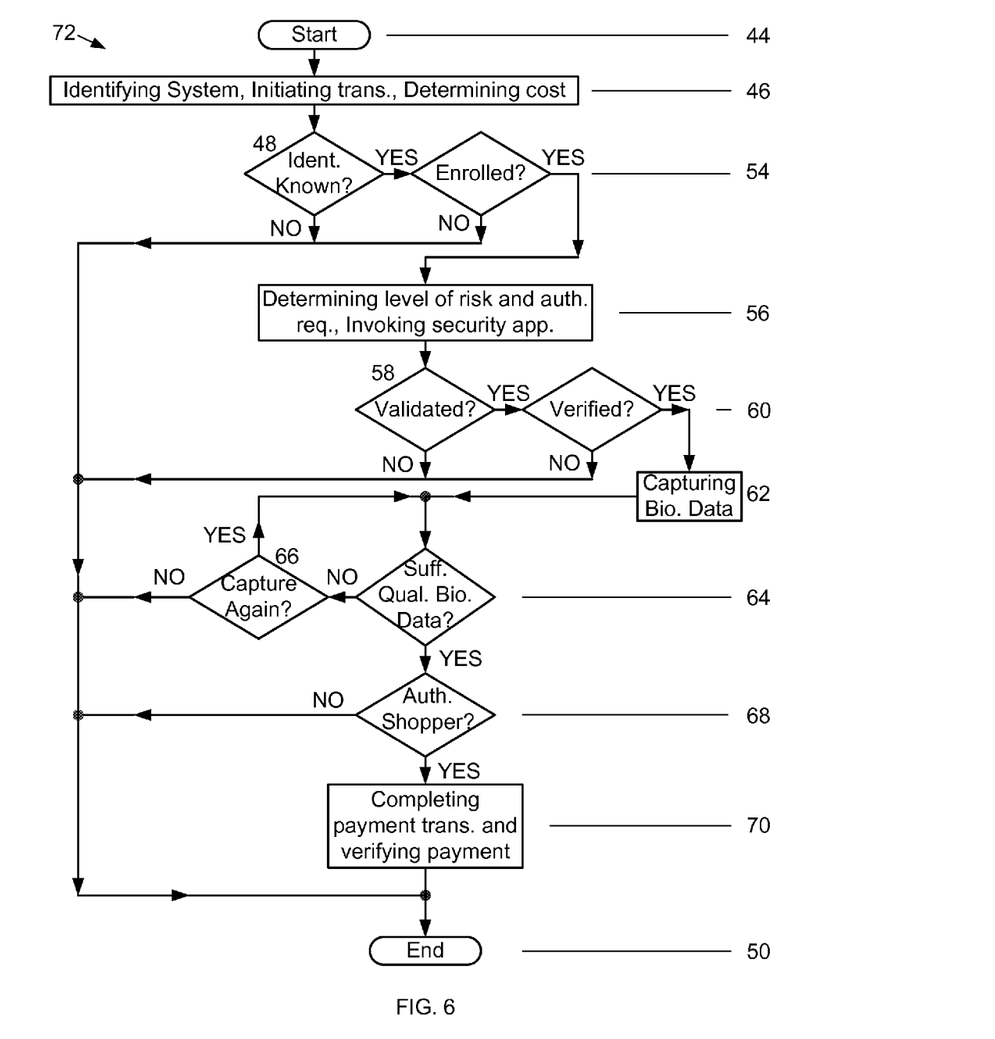
FIG. 6 is a flowchart illustrating an alternative exemplary authentication process for eliminating the need to wait in line before conducting payment transactions.

The information shown in FIG. 6 is the same information shown in FIG. 5 as described in more detail below. As such, operations illustrated in FIG. 6 that are identical to operations illustrated in FIG. 5, are identified using the same reference numerals used in FIG. 5.

FIG. 6 is a flowchart 72 illustrating an alternative exemplary authentication process used by the PTC system 10 for eliminating the need to wait in line to conduct payment transactions at a POS terminal in a retail establishment. This alternative embodiment is similar to that shown in FIG. 5. However, the SPC system 14 generates the payment transaction authorization message after the identity of the shopper is successfully authenticated. Thus, the payment transaction authorization message is generated after authenticating the shopper 68. Moreover, the SPC system 14 communicates directly with the BAC system 16 to facilitate conducting operations 54 to 70, instead of the MS system 12 as in the exemplary embodiment.

After determining that the service provider user identifier is known 48, processing continues by determining whether the communications device 18 is enrolled in the BAC system 16. Specifically, the SPC system 14 continues by generating a notification message and transmitting the notification message to the MS system 12. The notification message indicates that the service provider user identifier is known. After receiving the notification message, the MS system 12 continues processing by transmitting the service provider user identifier to the BAC system 16. After receiving the service provider user identifier, the BAC system 16 continues by comparing the received service provider user identifier against service provider user identifiers stored therein. Upon determining a match between the received service provider user identifier and one of the service provider user identifiers stored therein, the BAC system 16 continues processing by determining the communications device identifier associated with the one matching service provider user identifier and determining a state of the associated communications device identifier. When the state of the associated communications device identifier is enrolled 54, the communications device 18 is considered to be enrolled in the BAC system 16. When the state of the associated communications device identifier is not enrolled 54, processing ends 50.

After determining that the communications device 18 is enrolled 54, the BAC system 16 continues by notifying the SPC system 14 that the communications device 18 associated with the service provider user identifier is enrolled therein. In response, the SPC system 14 continues processing by determining the risk factors 32 associated with the electronic payment transaction and determining 56 the resultant level of risk for the electronic payment transaction.

After determining 56 the resultant level of risk, processing continues by determining 56 the authentication data requirement for the electronic payment transaction. Specifically, processing continues by generating an authentication request at the SPC system 14 and transmitting the authentication request to the BAC system 16 over the first communications channel. The authentication request contains at least the resultant level of risk. Next, processing continues by conducting operations 58 to 68 as described with regard to the exemplary embodiment.

After authenticating the shopper 68, the BAC system 16 continues processing by generating and transmitting an authentication result message to the SPC system 14. The authentication result message indicates that the identity of the shopper was successfully authenticated. In response to receiving the authentication result message, the SPC system 14 continues by generating a payment transaction authorization message and transmitting the payment transaction authorization message to the MS system 12. The payment authorization message indicates that the SPC system 14 has approved payment for the electronic payment transaction. Next, the MS system 12 continues processing by completing the desired electronic payment transaction 70 and transmitting a transaction complete message to the communications device 18 indicating that the transaction was completed. The communications device 18 continues by notifying the shopper by displaying the transaction complete message on the screen 28 for the shopper to see.

After receiving the transaction complete message, the communications device 18 continues processing by generating the electronic receipt for the electronic payment transaction. After displaying the electronic receipt on the screen 28, an employee of the retail establishment continues by scanning the machine readable code from the electronic receipt as the shopper leaves the retail establishment to determine the goods purchased and verify that the shopper is leaving with only the goods purchased. The employee continues by permitting the shopper to leave the retail establishment when the shopper is leaving with only the goods purchased. Next, processing ends 50.

Although the embodiments described herein do not include a one-time pass-phrase (OTPP), it should be appreciated that in other embodiments an OTPP may be included. In such other embodiments after authenticating the shopper 68, the BAC system 16 generates an OTPP, stores the generated OTPP therein, and transmits the OTPP to the communications device 18. The communications device displays the OTPP on the screen 28 for the shopper to see and prompts the shopper to then enter the OTPP into the communications device 18. After entering the OTPP into the communications device 18, the shopper activates a button or icon 26 which causes the communications device to transmit the OTPP to the SPC system 14. Next, the SPC system 14 transmits the OTPP to the BAC system 16 which compares the received OTPP against the OTPP stored therein. If the received OTPP matches the stored OTPP, the shopper is authenticated and is permitted to complete the payment transaction 70. Otherwise, processing ends 50.

The shopper may make a typographical error when entering the OTPP into the communications device 18. Thus, in other embodiments the OTPP may be automatically transmitted to the SPC system 14 when the shopper activates a button or icon 26 in response to a prompt to automatically transmit the OTPP, or the OTPP may be automatically transmitted to the SPC system 14 without pressing an icon or button 26. It should be understood that upon receiving the OTPP, the communications device 18 may prompt the shopper to select between manually entering the OTPP in the communications device 18 or automatically transmitting the OTPP to the SPC system 14. The shopper may enter an input indicating which to choose by pressing an appropriate icon or button 26.

It should be understood that the MS system 12, SPC system 14, BAC system 16 and communications device 18 may be configured to communicate in any manner, and in any order, to authenticate shoppers as authorized shoppers and thus reduce the time spent waiting to conduct payment transactions in retail establishments.

Although the BAC system 16 determines the authentication requirement by comparing an extracted level of risk against levels of risk 34 included in authentication policies stored therein in the exemplary embodiment, it should be appreciated that in other embodiments the communications device 18 may determine the authentication requirement by comparing the extracted level of risk against levels of risk 34 included in authentication policies stored therein.

It should be appreciated that biometrically authenticating identities facilitates increasing the level of trust that a shopper attempting to conduct a network-based electronic payment transaction in a retail establishment with a communications device 18 is an authorized shopper. Furthermore, it should be understood that by virtue of communicating over the first and second communications channels to facilitate capturing and transmitting biometric data, an additional level of security is provided which also facilitates increasing trust in authentication results that indicate a shopper is an authorized shopper. By implementing a higher authentication standard, it is more difficult for an unauthorized shopper to be authenticated as an authorized shopper. Thus, by virtue of facilitating an increase in trust in an authentication result that indicates a shopper is an authorized shopper, the processes and systems described herein facilitate increasing the security of network-based electronic payment transactions conducted in a retail establishment using the communications device 18.

The processes and systems described herein facilitate increasing the level of trust in network-based electronic payment transactions conducted in a retail establishment with a portable communications device, and thus facilitate reducing risks that such network-based electronic payment transactions will be conducted fraudulently. Moreover, the processes and systems described herein facilitate reducing the time shoppers spend in retail establishments conducting payment transactions. Furthermore, as a result of the processes and systems described herein, retail establishments should require fewer POS terminals which in turn facilitates reducing retail establishment operating costs. Providing a quick, easy, reliable, and convenient process of purchasing goods also facilitates attracting new customers to retail establishments and facilitates encouraging increased visits by existing customers and thereby facilitates enhancing revenue. The processes and systems described herein are believed to be applicable to many different businesses for reducing risks that network-based transactions associated with these different businesses will be conducted fraudulently.

In each embodiment, the above-described processes eliminate the need to wait in line to conduct payment transactions in a retail establishment. Moreover, the above described processes simultaneously facilitate enhancing revenue and reducing operating costs of retail establishments. In exemplary embodiments described herein, a shopper in a retail establishment uses his portable communications device to purchase goods instead of purchasing the goods at a POS terminal. After initiating a network-based electronic payment transaction on the communications device, biometric data corresponding to a level of risk is determined and captured from the shopper with the communications device, and used for biometrically authenticating the shopper. Upon biometrically authenticating the shopper, the electronic payment transaction is conducted and an electronic receipt including a machine readable code is generated.

Exemplary embodiments of authentication processes and systems that eliminate the need to wait in line to conduct payment transactions in retail establishments, and simultaneously facilitate enhancing revenue and reducing operating costs of retail establishments are described above in detail. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method of eliminating the need to wait in line to conduct a payment transaction in a retail establishment, said method comprising:
    invoking, by a shopper, an application in a communications device that causes the device to display a list of different retail establishments, the
    device being operated by, and designated by, the shopper for conducting payment transactions;
    identifying a merchant system to be used for conducting the payment transaction by selecting, by the shopper, a retail establishment from the list;
    selecting, by the device, a service provider user identifier associated with the selected retail establishment for conducting the transaction;
    initiating the payment transaction with the device;
    entering a machine readable code from at least one good with the device;
    determining a price of the at least one good and a total payment transaction cost;
    displaying the total payment transaction cost on the device;
    determining whether to approve payment for the electronic payment transaction;
    authenticating the shopper; and
    completing the electronic payment transaction in the retail establishment and transmitting a transaction complete message to the device after successfully authenticating the shopper.

2. A method in accordance with claim 1 further comprising:
    generating a receipt for the network-based electronic payment transaction, the receipt comprising a receipt machine readable code;
    displaying the receipt on the communications device;
    scanning the receipt machine readable code when the shopper leaves the retail establishment; and
    permitting the shopper to leave the retail establishment when the shopper is leaving with only the goods purchased.

3. A method in accordance with claim 1, said initiating operation comprising:
    calculating global positioning system coordinates of the communications device;
    comparing the calculated global positioning system coordinates against an area of the retail establishment; and
    conducting said operation when the calculated global positioning system coordinates are located within the area of the retail establishment.

4. A method in accordance with claim 3 further comprising deactivating a retail purchasing application in the communications device when the determined global positioning coordinates are not located within the retail establishment.

5. A method in accordance with claim 1 further comprising:
    determining risk factors for the electronic payment transaction;
    determining a resultant risk level for the electronic payment transaction;
    determining an authentication data requirement for the electronic payment transaction from the resultant risk level;
    generating an authentication data capture request and displaying the authentication data capture request on the communications device;
    capturing authentication data from the shopper with the communications device in accordance with the authentication data capture request;
    transmitting the captured authentication data to an authentication system; and
    comparing the captured authentication data against the authentication data of the shopper included in an enrollment data record stored in the authentication system.

6. A method in accordance with claim 5 further comprising generating an authentication result message with the authentication system and transmitting the authentication result message to a merchant system when the captured authentication data matches the authentication data of the shopper included in the enrollment data record.

7. A method in accordance with claim 1 further comprising using a service provider user identifier associated with the selected retail establishment for conducting the electronic payment transaction.

8. A method in accordance with claim 1, said entering operation comprising photographing the machine readable code, wherein the machine readable code is one of a bar code, a quality response code, and a data matrix code.

9. A method in accordance with claim 1 further comprising:
- displaying a transaction complete message on the communications device after said completing operation;
- prompting the shopper to activate a communications device button for generating a receipt for the electronic payment transaction; and
- displaying the receipt on the communications device.

10. A system for eliminating the need to wait in line to conduct a payment transaction in a retail establishment, said system comprising:
- a computer configured as a server, said server including at least a database, said server being configured to at least store within said database a first configurable policy and determine a resultant risk level associated with a payment transaction;
- a communications device designated by a shopper for conducting payment transactions, said communications device being configured to display a retail establishment list in response to user invocation of an application stored therein, the application configured to cause said communications device to display the list, said communications device being further configured to initiate the payment transaction in a retail establishment selected by the shopper from the list, to select a service provider user identifier associated with the retail establishment for conducting the payment transaction, to capture authentication data from the shopper in the selected retail establishment, and to generate a receipt for each payment transaction;
- an authentication system including an authentication system database, said authentication system being configured to store within said authentication system database authentication data for each of a plurality of authorized shoppers, and to conduct an authentication process while the shopper is in the selected retail establishment; and
- a merchant system configured to generate and transmit messages and to complete payment transactions, wherein said server, said communications device, said authentication system and said merchant system communicate with each other over a network, and wherein after said communications device generates a receipt for the payment transaction an employee of the selected retail establishment scans the receipt as the shopper leaves the selected retail establishment and permits the shopper to leave the selected retail establishment.

11. A system in accordance with claim 10, said communications device being further configured to:
- determine global positioning system coordinates;
- compare the global positioning system coordinates of said communications device against an area of the selected retail establishment; and
- photograph a machine readable code of at least one good when said communications device is located in the selected retail establishment.

12. A system in accordance with claim 10, said merchant system being further configured to:
- complete a payment transaction after receiving a payment transaction authorization from said server; and
- transmit a transaction complete message to said communications device after completing the transaction.

13. A system in accordance with claim 10, said communications device comprising one of:
- a smart phone;
- a tablet computer;
- a laptop computer; and
- a personal digital assistant.

14. A system in accordance with claim 10, said server being further configured to:
- compare a service provider user identifier input to said communications device against service provider user identifiers stored in said server; and
- determine that the inputted service provider user identifier is known when the input service provider user identifier matches one of the service provider service identifiers stored in said server.

15. A system in accordance with claim 10, said communications device being further configured to:
- display a transaction complete message on a screen after said merchant system completes the electronic payment transaction;
- prompt the shopper to activate a button for generating the receipt; and display the receipt on the screen.

\* \* \* \* \*